US012096195B2

(12) United States Patent
Okamoto et al.

(10) Patent No.: US 12,096,195 B2
(45) Date of Patent: Sep. 17, 2024

(54) DISPLAY DEVICE AND SPEAKER DEVICE

(71) Applicant: Sony Group Corporation, Tokyo (JP)

(72) Inventors: Kazumasa Okamoto, Tokyo (JP); Tatsuya Sakata, Tokyo (JP); Hiroaki Matsui, Tokyo (JP)

(73) Assignee: Sony Group Corporation (JP)

( * ) Notice: Subject to any disclaimer, the term of this patent is extended or adjusted under 35 U.S.C. 154(b) by 203 days.

(21) Appl. No.: 17/791,399

(22) PCT Filed: Jan. 8, 2021

(86) PCT No.: PCT/JP2021/000489
§ 371 (c)(1),
(2) Date: Jul. 7, 2022

(87) PCT Pub. No.: WO2021/149517
PCT Pub. Date: Jul. 29, 2021

(65) Prior Publication Data
US 2023/0039852 A1 Feb. 9, 2023

(30) Foreign Application Priority Data
Jan. 24, 2020 (JP) .................. 2020-009702

(51) Int. Cl.
H04R 7/04 (2006.01)
G02F 1/1333 (2006.01)

(52) U.S. Cl.
CPC .......... H04R 7/045 (2013.01); G02F 1/1333 (2013.01); H04R 2440/05 (2013.01); H04R 2499/15 (2013.01)

(58) Field of Classification Search
CPC .............. H04R 7/045; H04R 2440/05; H04R 2499/15; G02F 1/1333
See application file for complete search history.

(56) References Cited

U.S. PATENT DOCUMENTS

2019/0349685 A1* 11/2019 Choi ................. G02F 1/133608
2020/0097244 A1*  3/2020 Kim ......................... H04R 1/24
2022/0360733 A1* 11/2022 Kim ..................... H04R 1/2873

FOREIGN PATENT DOCUMENTS

JP       2007104602 A    4/2007
JP       2018534810 A   11/2018
(Continued)

OTHER PUBLICATIONS

English machine translation of KR-20190056621-A (Jae-Hyeok Lee; Display Apparatus, published May 2019) (Year: 2019).*

(Continued)

Primary Examiner — Mark Fischer
(74) Attorney, Agent, or Firm — Lerner David LLP

(57) ABSTRACT

The present technology relates to a display device and a speaker device capable of outputting sound from the display surface of a non-self-luminous display panel.

Provided is a display device including: a display panel unit that includes a non-self-luminous display cell; a light source unit that irradiates the display panel unit with light from a back surface; and an excitation unit that vibrates a constituent member constituting the display panel unit and outputs sound from a display surface of the display cell. The excitation unit provides excitation to an excitation member having a predetermined shape and a predetermined color to vibrate the constituent member that is fixed to the excitation member by a predetermined fixing method. The present technology can be applied to, for example, a liquid crystal display device.

18 Claims, 10 Drawing Sheets

(56) References Cited

FOREIGN PATENT DOCUMENTS

KR  20190056621 A * 5/2019 ............. H04R 9/025
WO  2018123310 A1   7/2018

OTHER PUBLICATIONS

International Search Report for PCT/JP2021/000489 dated Apr. 6, 2021; 3 pgs.

* cited by examiner

DISPLAY DEVICE AND SPEAKER DEVICE

CROSS-REFERENCE TO RELATED APPLICATIONS

This application is a national phase entry under 35 U.S.C. § 371 of International Application No. PCT/JP2021/000489 filed Jan. 8, 2021, which claims the priority from Japanese Patent Application No. 2020-009702 filed in the Japanese Patent Office on Jan. 24, 2020, the entire contents of which are hereby incorporated by reference.

TECHNICAL FIELD

The present technology relates to a display device and a speaker device, and more particularly to a display device and a speaker device capable of outputting sound from the display surface of a non-self-luminous display panel.

BACKGROUND ART

Thinner and lighter display devices, such as displays, have been growing rapidly. Along with this, speaker devices have also become thinner and lighter, and it has been proposed to use a flat panel speaker instead of a cone speaker.

A technology is disclosed in which a self-luminous display device incorporates a flat panel speaker and outputs sound from the display surface on which images are displayed (see, for example, Patent Document 1).

CITATION LIST

Patent Document

Patent Document 1: WO 2018/123310 A

SUMMARY OF THE INVENTION

Problems to be Solved by the Invention

Meanwhile, even in a non-self-luminous display device, there is a demand for outputting sound from the display surface on which images are displayed, but such a technical method is not established at present.

The present technology has been made in view of such a situation, and enables sound to be output from the display surface of a non-self-luminous display panel.

Solutions to Problems

A display device according to one aspect of the present technology includes: a display panel unit that includes a non-self-luminous display cell; a light source unit that irradiates the display panel unit with light from a back surface; and an excitation unit that vibrates a constituent member constituting the display panel unit and outputs sound from a display surface of the display cell. The excitation unit provides excitation to an excitation member having a predetermined shape and a predetermined color to vibrate the constituent member that is fixed to the excitation member by a predetermined fixing method.

In the display device according to one aspect of the present technology, the display panel unit that includes the non-self-luminous display cell, the light source unit that irradiates the display panel unit with light from the back surface, and the excitation unit that vibrates the constituent member constituting the display panel unit and outputs sound from the display surface of the display cell are provided. The excitation member having a predetermined shape and a predetermined color is excited by the excitation unit, so that the constituent member fixed to the excitation member by a predetermined fixing method is vibrated.

A speaker device according to one aspect of the present technology includes: an excitation unit that vibrates a constituent member constituting a display panel unit including a non-self-luminous display cell and outputs sound from a display surface of the display cell. The excitation unit provides excitation to an excitation member having a predetermined shape and a predetermined color to vibrate the constituent member that is fixed to the excitation member by a predetermined fixing method.

In the speaker device according to one aspect of the present technology, the excitation unit that vibrates the constituent member constituting the display panel unit including the non-self-luminous display cell and outputs sound from the display surface of the display cell is provided. The excitation member having a predetermined shape and a predetermined color is excited by the excitation unit, so that the constituent member fixed to the excitation member by a predetermined fixing method is vibrated.

The display device and the speaker device according to one aspect of the present technology may be independent devices or internal blocks constituting a single device.

MODE FOR CARRYING OUT THE INVENTION

1. Embodiments of Present Technology (Configuration of Display Device)

Figure 1:
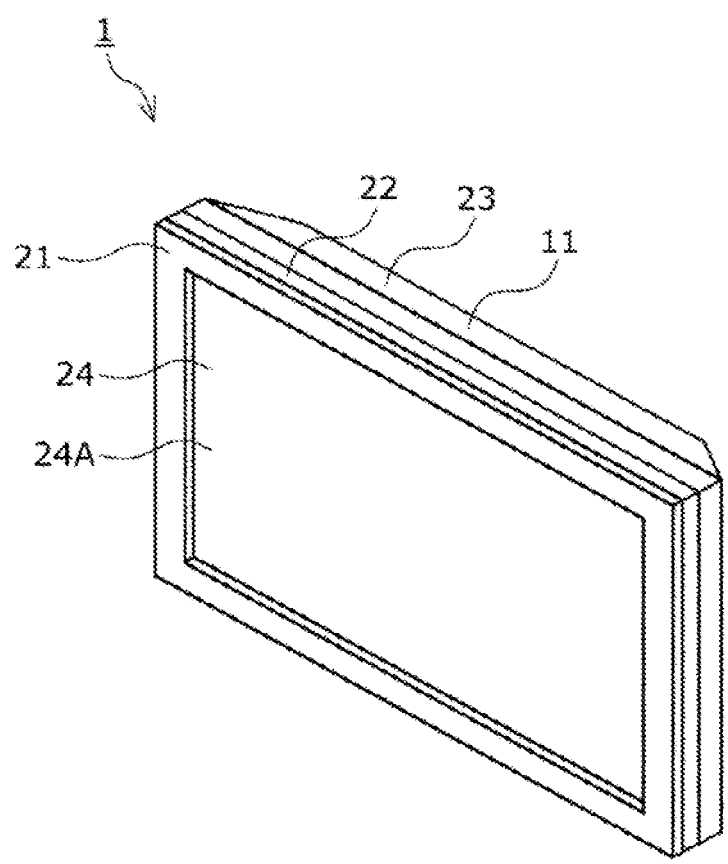
FIG. 1 is a perspective view illustrating the appearance of a display device to which the present technology is applied.
Figure 2:
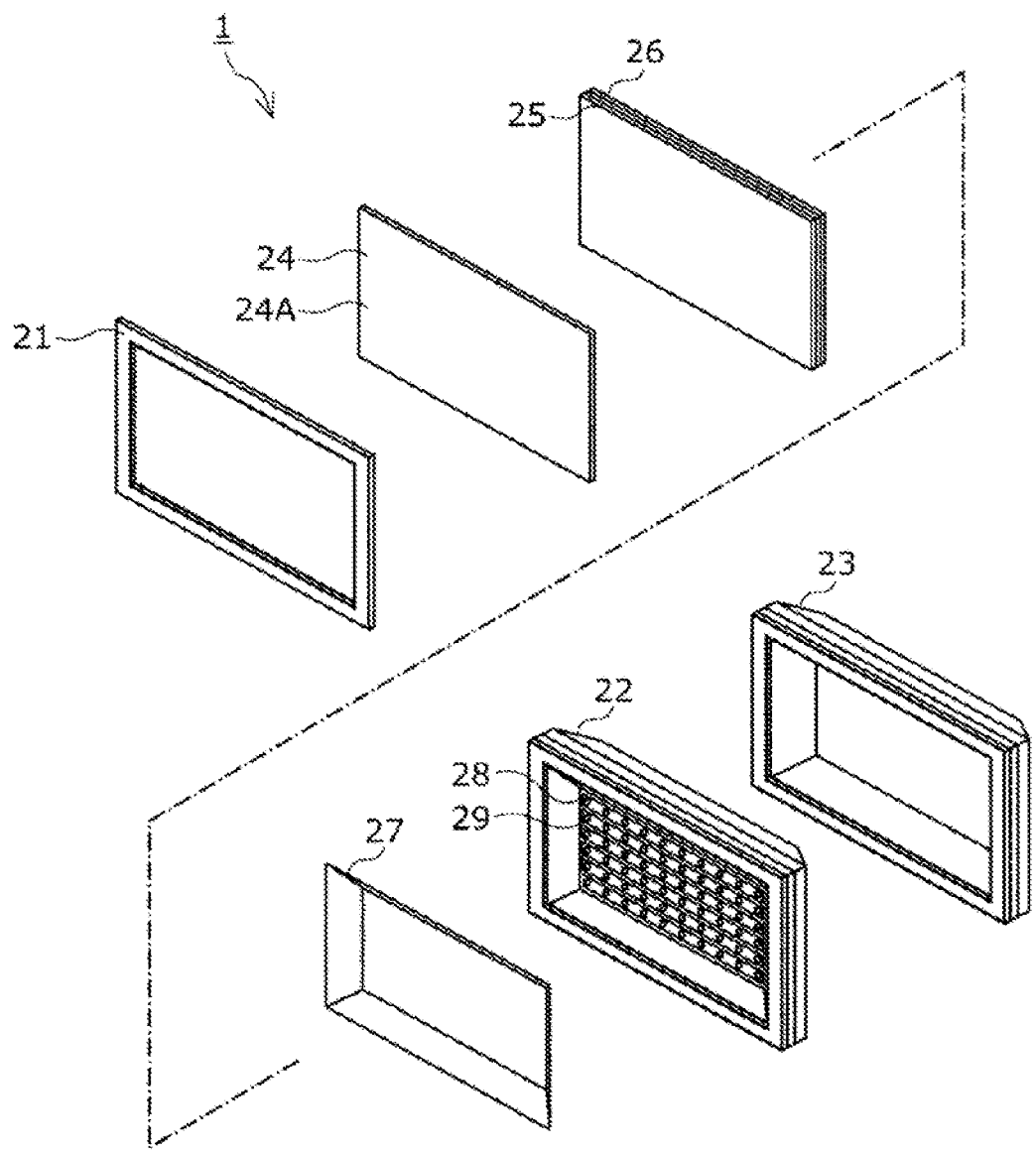
FIG. 2 is a schematic exploded perspective view of the display device to which the present technology is applied.

A display device to which the present technology is applied will be described with reference to FIGS. 1 and 2. FIG. 1 is a perspective view illustrating the appearance of the display device to which the present technology is applied. FIG. 2 is a schematic exploded perspective view of the display device to which the present technology is applied.

A display device 1 also serves as a speaker device that outputs sound. That is, the display device 1 has a built-in speaker device, and is configured such that sound is output from the display surface on which images are displayed. For example, the display device 1 is a liquid crystal display device and is configured as a television receiver.

In FIG. 1, the display device 1 is held by a stand (not illustrated), and necessary parts are arranged in a housing 11. The housing 11 has a bezel 21 located on the front side that is the user side, and a back chassis 22 located on the rear side that is the opposite side.

The bezel 21 is formed in a substantially rectangular frame shape. The back chassis 22 is formed in a shallow box shape opened forward. A control board (not illustrated) is mounted to the rear surface of the back chassis 22. The control board functions as a control circuit that supplies current to a display panel unit, supplies drive current to a light source unit such as a backlight, and that performs overall control of the display device 1.

A rear cover 23 is mounted to the back chassis 22 from the rear. The rear cover 23 is formed in a shallow box shape having an opening in the front, and the control board is closed by the rear cover 23.

A liquid crystal display cell 24 is mounted on the inner peripheral side of bezel 21. The liquid crystal display cell 24 is configured by, for example, a polarizing plate, a glass substrate, a liquid crystal layer, and the like being laminated, and a display surface 24A on which images are displayed is formed on the front surface of the liquid crystal display cell 24.

The liquid crystal display cell 24 is formed in a substantially rectangular shape, the parts other than the outer periphery are provided as a display area where images are displayed, and the outer periphery is held by bezel 21. A connection board (not illustrated) is provided at the lower end of the liquid crystal display cell 24, and the connection board is connected to the control board mounted to the rear surface of the back chassis 22.

As illustrated in FIG. 2, an optical sheet 25 and a diffusion plate 26 are mounted on the rear side of the liquid crystal display cell 24. The optical sheet 25 is mounted in a laminated state on the front side of the diffusion plate 26.

The optical sheet 25 has functions, such as a light diffusion function and a light travel direction control function, and achieves the uniformity and improvement of luminance in the liquid crystal display cell 24. The diffusion plate 26 has the function of diffusing light emitted from a light source to achieve the uniformity of luminance in liquid crystal display cell 24.

A circuit board 28 is mounted to the front surface of the back chassis 22, for example, with spacing in the vertical direction. The circuit board 28 is formed in a horizontally long shape, for example, and is connected to the control board mounted to the rear surface of the back chassis 22.

The light source, such as a plurality of light emitting diodes (LEDs), is mounted in the circuit board 28. As the light source, LEDs 51 in FIG. 3 to be described later are used, and covered with a light source cover 29.

A reflective sheet 27 is disposed on the front side of the back chassis 22. In the reflective sheet 27, holes for the light source are formed so as to be separated from each other in the vertical and horizontal directions. In a state in which the reflective sheet 27 is disposed on the front side of the back chassis 22, the light source (LED) is inserted and disposed in each of the holes for the light source, and the light source (LED) protrudes forward from the front surface of the reflective sheet 27.

In the display device 1 configured as described above, when light is emitted from the light source including a plurality of LEDs, the light is diffused by the diffusion plate 26 and incident on the back side of the liquid crystal display cell 24 as a backlight. At this time, part of the light emitted from the light source is reflected by the reflective sheet 27 and is incident from the back side of the liquid crystal display cell 24 through the diffusion plate 26.

(Output of Sound from Display Surface)

By the way, in a self-luminous display device such as an OLED display device, images are displayed by a self-luminous display cell in which a self-luminous element such as an organic light emitting diode (OLED) is disposed. Therefore, sound can be output from the display surface of a display panel by directly vibrating the back surface of the display panel.

Meanwhile, a non-self-luminous display device such as a liquid crystal display device has a structure in which a light source unit such as a backlight is provided in addition to a display panel. Therefore, if an excitation mechanism for outputting sound is disposed between the display panel and the light source unit, there is a problem that the supply of light to the display panel is interrupted by the part of the excitation mechanism and becomes non-uniform. Therefore, in the non-self-luminous display device, a structure similar to that of the self-luminous display device cannot be used, and there has been a demand for proposal of a technology for outputting sound from the display surface of a non-self-luminous display cell such as a liquid crystal display cell.

Hereinafter, as a display device to which the present technology is applied, the configuration of a non-self-luminous display device capable of outputting sound from the display surface of a non-self-luminous display cell will be described with reference to the drawings.

(Cross-Sectional View of Main Part)

Figure 3:
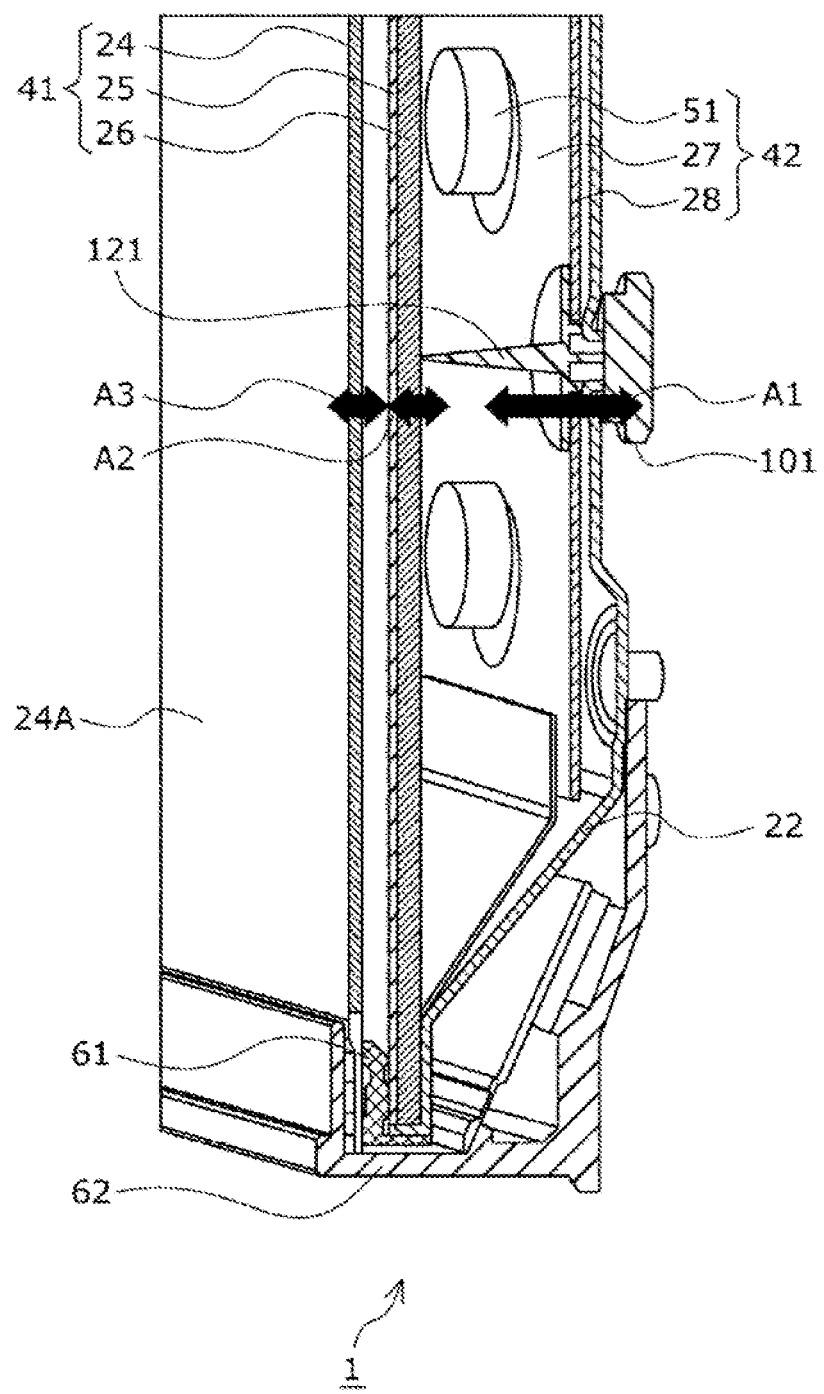
FIG. 3 is a cross-sectional view of the main part of a display device having a direct-type backlight structure.

FIG. 3 is a cross-sectional view of the main part of the display device 1 having a direct-type backlight structure. This cross-sectional view of the main part illustrates a part of the cross section of the display device 1 in FIG. 1 when viewed from the side.

In FIG. 3, the circuit board 28 is supported by the back chassis 22 provided to the back thereof. A plurality of LEDs 51 is mounted in the circuit board 28 so as to be arranged at predetermined intervals. On the circuit board 28, the reflective sheet 27 is mounted in such a manner that the LEDs 51 are exposed from the holes for the light source. Note that the plurality of LEDs 51 is covered with the light source cover 29.

The diffusion plate 26 is provided at a certain distance from the LEDs 51, and diffuses the light emitted from the LEDs 51. The optical sheet 25 is mounted on the diffusion plate 26. Furthermore, a support member 61 is mounted for the purpose of fixing the optical sheet 25 and fixing the liquid crystal display cell 24 that is mounted to the front surface of the optical sheet 25.

The liquid crystal display cell 24 is configured by, for example, a polarizing plate, a glass substrate, a liquid crystal layer, and the like being laminated, and a display surface 24A on which images are displayed is formed on the front surface of the liquid crystal display cell 24. Moreover, a cabinet 62 is mounted further outside the liquid crystal display cell 24 and the support member 61. Note that the cabinet 62 may be shared with the bezel 21 that serves as the exterior of the display device 1.

Furthermore, in FIG. 3, an excitation unit 101 such as an exciter is mounted on the back side of the back chassis 22, and an excitation member 121 mounted to the excitation unit 101 is exposed on the reflective sheet 27 mounted to the circuit board 28.

For example, the excitation unit 101 and the excitation member 121 are mounted so as to have a relative positional relationship with the LEDs 51. Specifically, in the example of FIG. 3, when viewed from the display surface 24A side, the excitation member 121 is installed at the intersection of the diagonal lines of a quadrangle with the installation position of the four LEDs 51 as vertices. That is, for example, one or more excitation units 101 and excitation members 121 can be provided depending on the installation position and number of the LEDs 51.

The excitation member 121 has a predetermined shape and a predetermined color. For example, in FIG. 3, the excitation member 121 has a pin shape, such as a cone with a pointed tip mounted to the center of a disc, and the tip of the cone is in contact with the surface of the diffusion plate 26.

The excitation member 121 and the diffusion plate 26 are fixed by a predetermined fixing method. The excitation unit 101 can vibrate the diffusion plate 26 (in the direction indicated by arrow A2 in the drawing) by the excitation of the excitation member 121 (in the direction indicated by arrow A1 in the drawing).

In the display device 1 configured as described above, the excitation member 121 causes the diffusion plate 26 to vibrate (in the direction indicated by the arrow A2 in the drawing) and output sound as a diaphragm, and the liquid crystal display cell 24 functions as a sound wave transmission component (arrow A3 in the drawing) to output sound transmitted from the diffusion plate 26, so that the sound can be output from the display surface 24A of the liquid crystal display cell 24.

Figure 4:
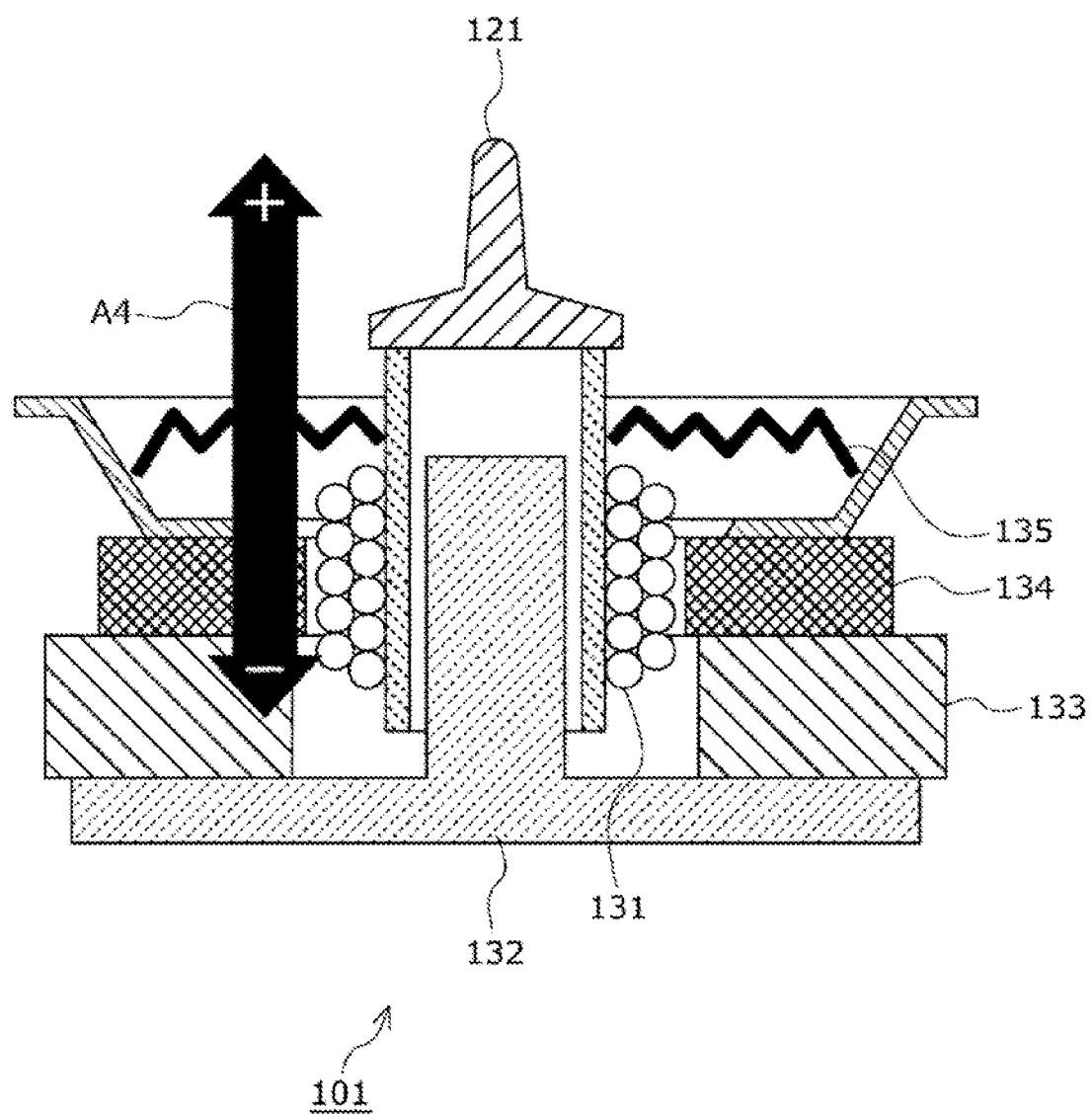
FIG. 4 is a detailed cross-sectional view of an excitation unit.

FIG. 4 is a detailed cross-sectional view of the excitation unit 101 in FIG. 3.

The excitation unit 101 is configured as an excitation device such as an exciter, and uses the diffusion plate 26 in contact with the excitation member 121 as a diaphragm to output sound.

In FIG. 4, in the excitation unit 101, a yoke 132, a magnet 133, and a plate 134, which constitute a magnetic circuit, convert the electric signal applied to a voice coil 131 into the linear motion of (the bobbin of) the voice coil 131. A damper 135 supports the voice coil 131.

The excitation member 121 is mounted to the voice coil 131. The voice coil 131 can vibrate the excitation member 121 by performing a vertical linear motion (movement in the direction indicated by arrow A4 in the drawing) with the stroke amount corresponding to the electric signal.

As described above, in the display device 1, the excitation member 121 for transmitting vibration is provided in contact with the surface of the diffusion plate 26 and vibrated by the excitation unit 101, so that the diffusion plate 26 vibrates as a diaphragm, electric signals are converted into sound, and the sound can be output from the display surface 24A of the liquid crystal display cell 24.

Moreover, in the display device 1, the excitation member 121 that hardly affects the propagation of light is disposed between the diffusion plate 26 and a backlight unit 42, and the excitation unit 101 is disposed on the back of the backlight unit 42, so that the problem that the supply of light from the backlight unit 42 to a liquid crystal panel unit 41 is interrupted by the excitation mechanism is reduced.

Note that in the display device 1, the liquid crystal panel unit 41 is a display panel unit including the liquid crystal display cell 24, the optical sheet 25, the diffusion plate 26, and the like, and the backlight unit 42 is a light source unit including the circuit board 28, the LEDs 51, and the like. That is, the diffusion plate 26 is a constituent member that constitutes the liquid crystal panel unit 41, and the excitation member 121 is mounted to the constituent member.

(Configuration of Excitation Member)

Next, the detailed configuration of the excitation member 121 will be described. In FIGS. 3 and 4 described above, the case where the excitation member 121 has a pin shape has been illustrated, but other shapes can be used. Furthermore, various forms can be used for the color of the excitation member 121 and the method for fixing the excitation member 121 to the diffusion plate 26.

First Example

Figure 5:
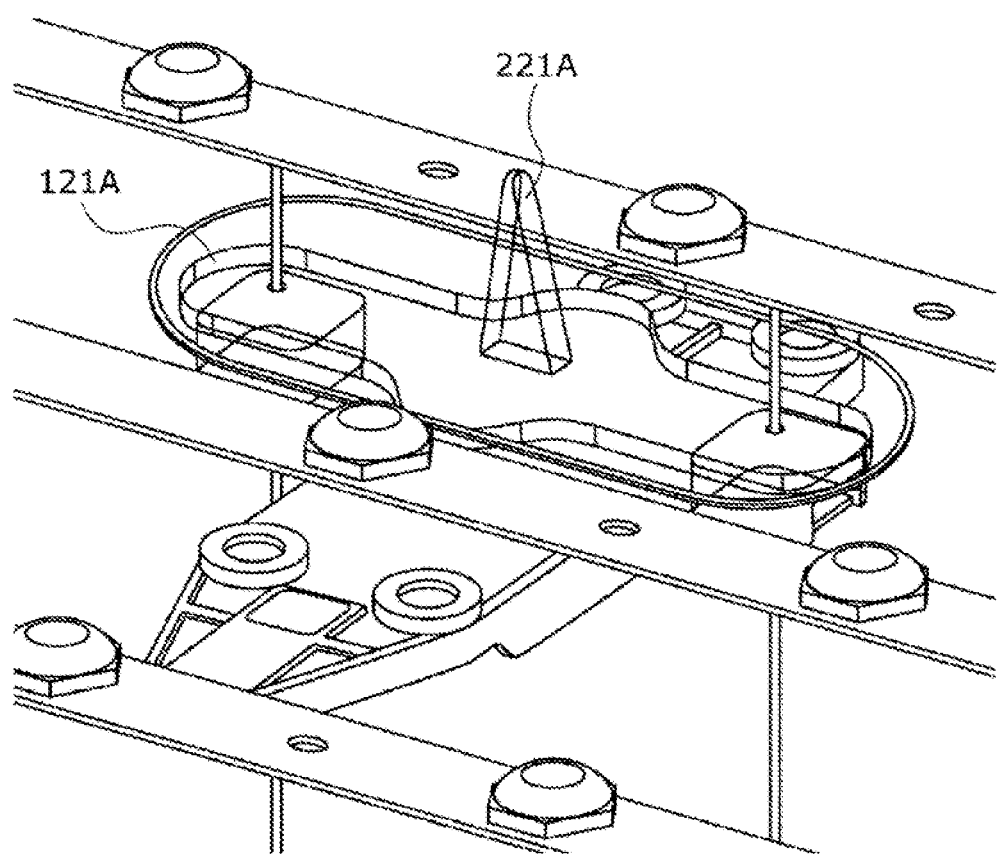
FIG. 5 illustrates a first example of the configuration of an excitation member.
Figure 6:
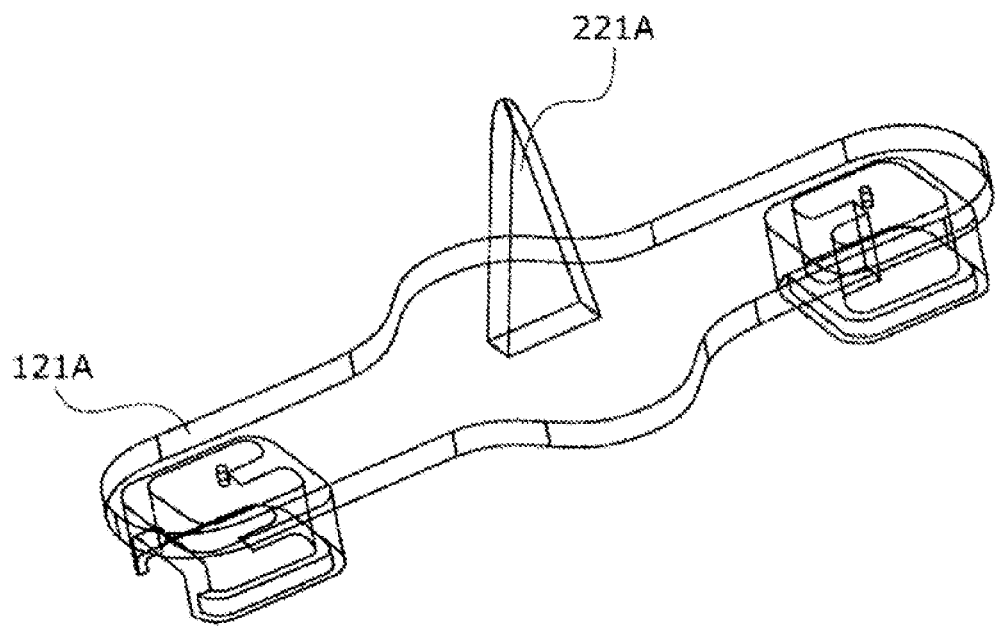
FIG. 6 illustrates the first example of the configuration of the excitation member.
Figure 7:
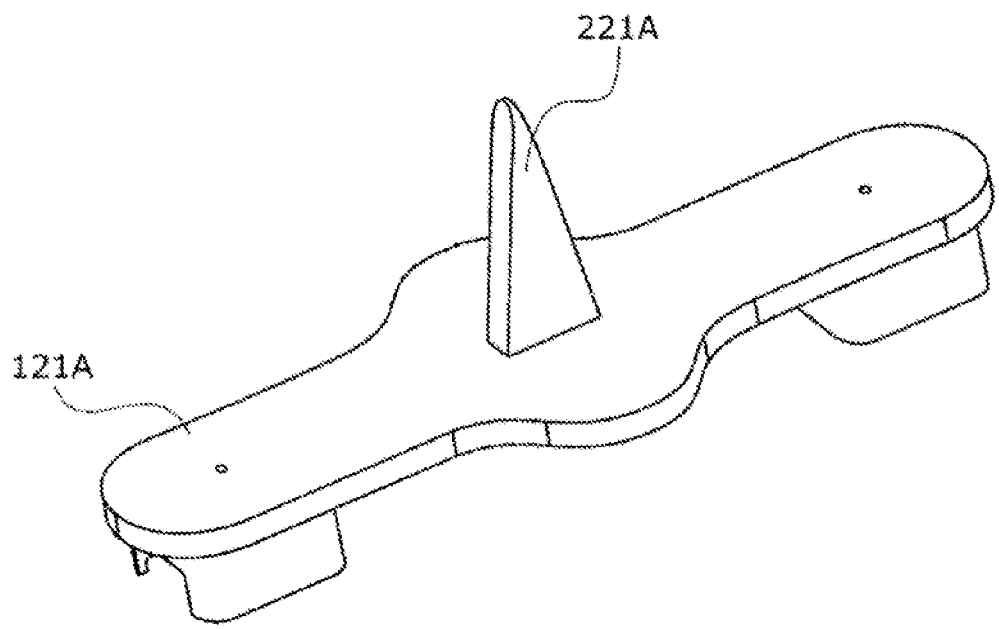
FIG. 7 illustrates the first example of the configuration of the excitation member.

FIGS. 5 to 7 illustrate a first example of the configuration of the excitation member 121. FIG. 5 illustrates a state in which the excitation member 121 is mounted to the excitation unit 101 in the display device 1.

In FIG. 5, an excitation member 121A has a shape in which a triangular plate-shaped protrusion 221A with an acute angle at the tip is formed at the center of a horizontally long rectangular plate having rounded corners. Furthermore, in the excitation member 121A, the central part where the protrusion 221A is formed has a shape bulging outward.

The excitation member 121A is mounted to the excitation unit 101 such that the tip of the protrusion 221A formed on the plate is in contact with the surface of the diffusion plate 26. That is, in FIG. 5, the number of support points of the excitation member 121A with respect to the diffusion plate 26 is one.

The color of the excitation member 121A can be any color, and in FIG. 5, is transparent with high transmittance, so that the other side can be seen through.

Furthermore, the color of the excitation member 121A may have the same color as or have a color corresponding to the color of the diffusion plate 26. For example, in a case where the color of the diffusion plate 26 is milky white, the color of the excitation member 121A can be milky white. Note that the color of the excitation member 121A is not limited to a transparent color or milky white, and other colors such as a translucent color or white may be used.

The tip of the protrusion 221A of the excitation member 121A may be fixed to the surface of diffusion plate 26 or may be in abutting contact with the surface of the diffusion plate 26.

For example, in a case where the tip of the protrusion 221A of the excitation member 121A is fixed to the surface of the diffusion plate 26, the tip of the protrusion 221A can be completely fixed using a stabilizer, an adhesive, screw fastening, or the like. In a case where a stabilizer is used, the tip of the protrusion 221A is fixed to the surface of the diffusion plate 26 by a component such as a metal fitting. Furthermore, for example, in a case where the tip of the protrusion 221A of the excitation member 121A is brought into abutting contact with the surface of the diffusion plate 26, the tip of the protrusion 221A can be positioned and fixed in abutting contact with the surface of the diffusion plate 26 using a vibration-damping sheet or the like.

FIGS. 6 and 7 illustrate a configuration in a case where the excitation member 121A is removed from the excitation unit 101. FIG. 6 illustrates a state in which the other side can be seen through in a case where the excitation member 121A has a predetermined color and high transmittance. FIG. 7 illustrates a state in which the other side cannot be seen through in a case where the excitation member 121A has a predetermined color and low transmittance.

Second Example

Figure 8:
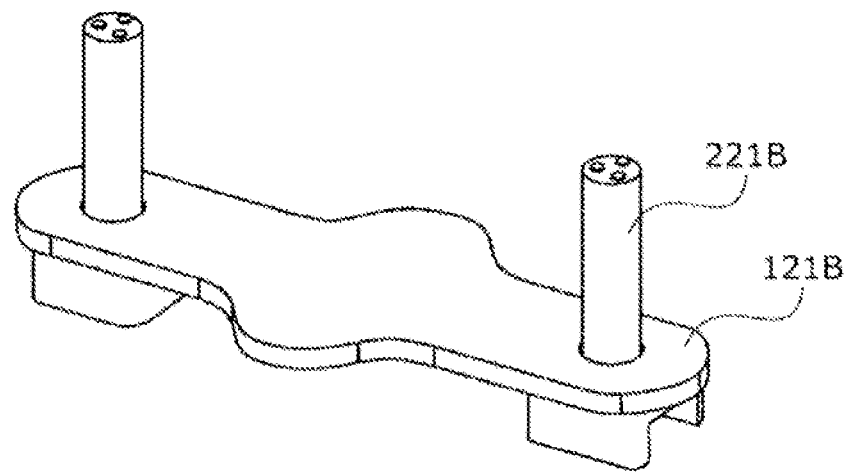
FIG. 8 illustrates a second example of the configuration of the excitation member.

FIG. 8 illustrates a second example of the configuration of the excitation member 121.

In FIG. 8, an excitation member 121B has a shape in which cylindrical protrusions 221B are formed at two positions separated by a predetermined distance from the center of a horizontally long rectangular plate with rounded corners. Furthermore, in the excitation member 121B, the central part has a shape bulging outward.

The excitation member 121B is mounted to the excitation unit 101 such that the leading ends of the protrusions 221B formed on the plate are in contact with the surface of the diffusion plate 26. That is, in FIG. 8, the number of support points of the excitation member 121B with respect to the diffusion plate 26 is two.

The color of the excitation member 121B can be the same as or corresponding to the color of the diffusion plate 26, for example, milky white. Furthermore, the leading ends of the protrusions 221B of the excitation member 121B may be completely fixed to the surface of the diffusion plate 26 using, for example, a stabilizer or the like, or may be positioned and fixed in abutting contact with the surface of the diffusion plate 26 using, for example, a vibration-damping sheet or the like.

Third Example

Figure 9:
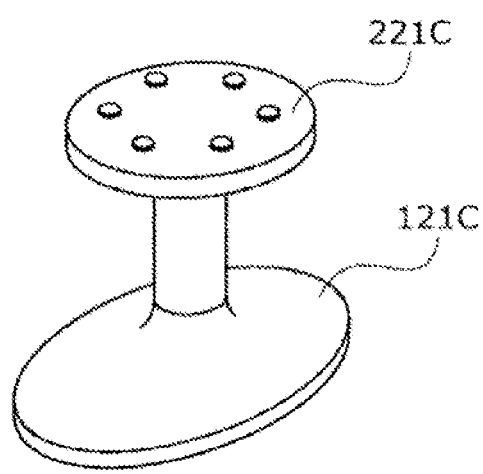
FIG. 9 illustrates a third example of the configuration of the excitation member.

FIG. 9 illustrates a third example of the configuration of the excitation member 121.

In FIG. 9, an excitation member 121C has a shape in which a disc-shaped protrusion 221 C is formed on the leading-end side of a rod-shaped cylinder extending from the center of an elliptical plate. The protrusion 221C has six equally spaced protrusions formed on the circumference having a predetermined radius from the center of the disc.

The excitation member 121C is mounted to the excitation unit 101 such that the surface of the protrusion 221C formed on the elliptical plate is in contact with the surface of the diffusion plate 26. That is, in FIG. 9, the number of support points of the excitation member 121C with respect to the diffusion plate 26 is six.

The color of the excitation member 121C can be the same as or corresponding to the color of the diffusion plate 26, for example, milky white. Furthermore, the surface of the protrusion 221C of the excitation member 121C may be completely fixed to the surface of the diffusion plate 26 using, for example, a stabilizer or the like, or may be positioned and fixed in abutting contact with the surface of the diffusion plate 26 using, for example, a vibration-damping sheet or the like.

Fourth Example

Figure 10:
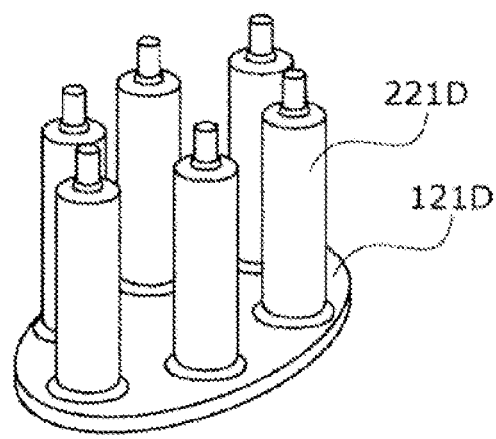
FIG. 10 illustrates a fourth example of the configuration of the excitation member.

FIG. 10 illustrates a fourth example of the configuration of the excitation member 121.

In FIG. 10, an excitation member 121D has a shape in which six rod-shaped cylindrical protrusions 221D are formed at equal intervals along the edge of an elliptical plate. The diameter of the leading-end vicinity of each of the six protrusions 221D is smaller than the diameter up to a point partway towards the leading end.

The excitation member 121D is mounted to the excitation unit 101 such that the leading ends of the protrusions 221D formed on the elliptical plate are in contact with the surface of the diffusion plate 26. That is, in FIG. 10, the number of support points of the excitation member 121D with respect to the diffusion plate 26 is six.

The color of the excitation member 121D can be the same as or corresponding to the color of the diffusion plate 26, for example, milky white. Furthermore, the leading ends of the six protrusions 221D of the excitation member 121D may be completely fixed to the surface of the diffusion plate 26 using, for example, a stabilizer or the like, or may be positioned and fixed in abutting contact with the surface of the diffusion plate 26 using, for example, a vibration-damping sheet or the like.

Fifth Example

Figure 11:
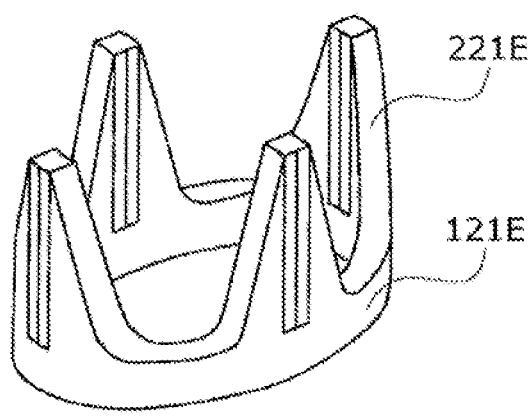
FIG. 11 illustrates a fifth example of the configuration of the excitation member.

FIG. 11 illustrates a fifth example of the configuration of the excitation member 121.

In FIG. 11, an excitation member 121E has the shape of a hollow ellipsoid on which four protrusions 221E are formed at equal intervals. Each of the protrusions 221E has a substantially triangular shape when viewed from the outer peripheral side, but the leading-end side thereof has a flat shape, that is, a trapezoidal shape, rather than an acute-angled shape.

The excitation member 121E is mounted to the excitation unit 101 such that the leading ends of the protrusions 221E formed on the ellipsoid are in contact with the surface of the diffusion plate 26. That is, in FIG. 11, the number of support points of the excitation member 121E with respect to the diffusion plate 26 is four.

The color of the excitation member 121E can be the same as or corresponding to the color of the diffusion plate 26, for example, milky white. Furthermore, the leading ends of the four protrusions 221E of the excitation member 121E may be completely fixed to the surface of the diffusion plate 26 using, for example, a stabilizer or the like, or may be positioned and fixed in abutting contact with the surface of the diffusion plate 26 using, for example, a vibration-damping sheet or the like.

Sixth Example

Figure 12:
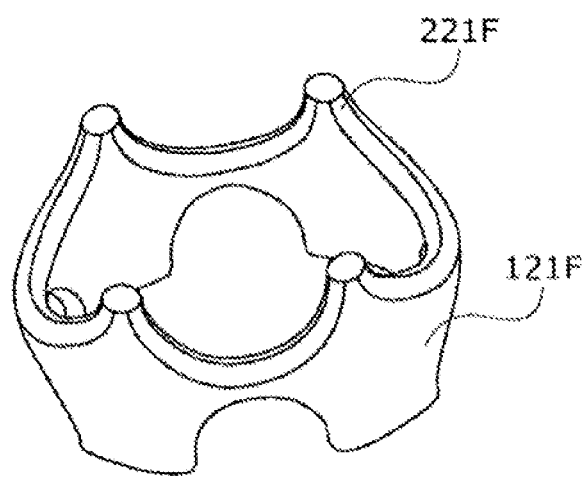
FIG. 12 illustrates a sixth example of the configuration of the excitation member.

FIG. 12 illustrates a sixth example of the configuration of the excitation member 121.

In FIG. 12, an excitation member 121F has a shape in which four protrusions 221F are formed at equal intervals as a hollow circular three-dimensional object.

The protrusions 221F have shapes obtained by cutting away four arcs having a predetermined diameter as viewed from the outer peripheral side, at equal intervals from the upper surface. Furthermore, on the opposite side (the lower surface on the opposite side from the upper surface) of the arcs forming the protrusions 221F, four arcs having different diameters are cut away at equal intervals.

The excitation member 121F is mounted to the excitation unit 101 such that the leading ends of the protrusions 221F formed on the three-dimensional object are in contact with the surface of the diffusion plate 26. That is, in FIG. 12, the number of support points of the excitation member 121F with respect to the diffusion plate 26 is four.

The color of the excitation member 121F can be the same as or corresponding to the color of the diffusion plate 26, for example, milky white. Furthermore, the leading ends of the four protrusions 221F of the excitation member 121F may be completely fixed to the surface of the diffusion plate 26 using, for example, a stabilizer or the like, or may be positioned and fixed in abutting contact with the surface of the diffusion plate 26 using, for example, a vibration-damping sheet or the like.

Seventh Example

Figure 13:
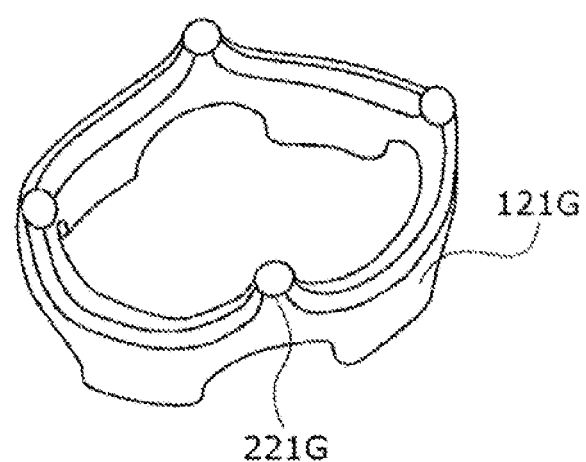
FIG. 13 illustrates a seventh example of the configuration of the excitation member.

FIG. 13 illustrates a seventh example of the configuration of the excitation member 121.

In FIG. 13, an excitation member 121G has a shape in which four protrusions 221G are formed at equal intervals as a hollow circular three-dimensional object.

The protrusions 221G have shapes obtained by cutting away four arcs having a predetermined diameter as viewed from the outer peripheral side, at equal intervals from the upper surface. Furthermore, on the opposite side (the lower surface on the opposite side from the upper surface) of the arcs forming the protrusions 221G, four arcs having different diameters are cut away at equal intervals and displaced by a predetermined angle.

The excitation member 121G is mounted to the excitation unit 101 such that the leading ends of the protrusions 221G formed on the three-dimensional object are in contact with the surface of the diffusion plate 26. That is, in FIG. 13, the number of support points of the excitation member 121G with respect to the diffusion plate 26 is four.

The color of the excitation member 121G can be the same as or corresponding to the color of the diffusion plate 26, for example, milky white. Furthermore, the leading ends of the four protrusions 221G of the excitation member 121G may be completely fixed to the surface of the diffusion plate 26 using, for example, a stabilizer or the like, or may be positioned and fixed in abutting contact with the surface of the diffusion plate 26 using, for example, a vibration-damping sheet or the like.

Eighth Example

Figure 14:
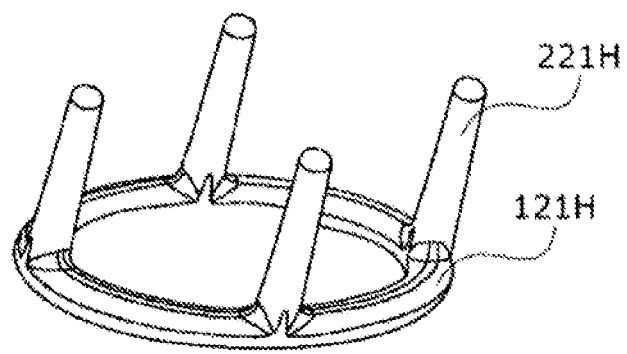
FIG. 14 illustrates an eighth example of the configuration of the excitation member.

FIG. 14 illustrates an eighth example of the configuration of the excitation member 121.

In FIG. 14, an excitation member 121H has the shape of a hollow ellipsoid on which four protrusions 221H are formed at equal intervals. The protrusions 221H each have a rod-like shape with a rounded tip.

The excitation member 121H is mounted to the excitation unit 101 such that the leading ends of the protrusions 221H formed on the ellipsoid are in contact with the surface of the diffusion plate 26. That is, in FIG. 14, the number of support points of the excitation member 121H with respect to the diffusion plate 26 is four.

The color of the excitation member 121H can be the same as or corresponding to the color of the diffusion plate 26, for example, milky white. Furthermore, the leading ends of the four protrusions 221H of the excitation member 121H may be completely fixed to the surface of the diffusion plate 26 using, for example, a stabilizer or the like, or may be positioned and fixed in abutting contact with the surface of the diffusion plate 26 using, for example, a vibration-damping sheet or the like.

Ninth Example

Figure 15:
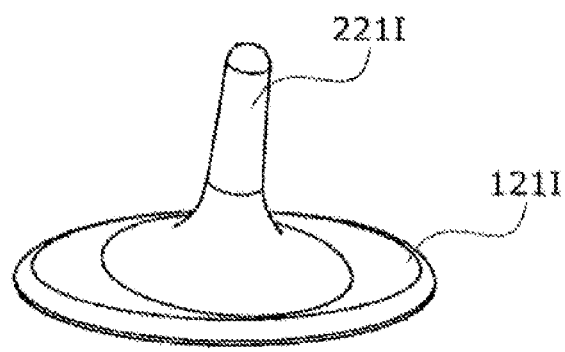
FIG. 15 illustrates a ninth example of the configuration of the excitation member.

FIG. 15 illustrates a ninth example of the configuration of the excitation member 121.

In FIG. 15, an excitation member 121I has a shape in which a single protrusion 221I is formed in the center on a disc. The protrusion 221I has a rod-like shape with a rounded tip.

The excitation member 121I is mounted to the excitation unit 101 such that the leading end of the protrusion 221I formed on the disc is in contact with the surface of the diffusion plate 26. That is, in FIG. 15, the number of support points of the excitation member 121I with respect to the diffusion plate 26 is one.

The color of the excitation member 121I can be the same as or corresponding to the color of the diffusion plate 26, for example, milky white. Furthermore, the leading end of the protrusion 221I of the excitation member 121I may be completely fixed to the surface of the diffusion plate 26 using, for example, a stabilizer or the like, or may be positioned and fixed in abutting contact with the surface of the diffusion plate 26 using, for example, a vibration-damping sheet or the like.

As described above, the excitation member 121 having the predetermined shape and the predetermined color is fixed to the diffusion plate 26 by the predetermined fixing method. Thus, when the excitation unit 101 vibrates the excitation member 121, the vibration is transmitted to the diffusion plate 26 by the excitation member 121, the diffusion plate 26 vibrates as a diaphragm, and sound can be output from the display surface 24A of the liquid crystal display cell 24.

Furthermore, when mounting the excitation member 121, it is necessary to consider the influence of shadows and chattering sound, but the above-described excitation members 121A to 121I have a predetermined shape and a predetermined color and are fixed to the diffusion plate 26 by a predetermined fixing method to provide countermeasures against shadows and chattering sound.

For example, shadow countermeasures can be applied to the excitation member 121 by setting the color to the same color as the diffusion plate 26, such as milky white, or by setting the shape to a shape less likely to create shadows caused by light from the backlight unit 42.

Chattering sound is a type of distortion that occurs in speaker devices and is unsteady distortion generated by contact or foreign objects, and can occur in a case where the excitation member 121 is not sufficiently fixed to the diffusion plate 26. The display device 1 can provide countermeasures against chattering sound by fixing the leading end of the protrusion 221 of the excitation member 121 to the surface of the diffusion plate 26 using a predetermined fixing method such as a stabilizer, an adhesive, screw fastening, or a vibration-damping sheet.

For example, it has been confirmed by the detailed simulation by the inventors of the present technology that the shadows could be sufficiently removed by using the excitation member 121F having the shape illustrated in FIG. 12 and having the same milky white color as the diffusion plate 26. Similarly, for example, it has been confirmed that the shadows could be sufficiently removed by using the excitation member 121G having the shape illustrated in FIG. 13 and having the same milky white color as the diffusion plate 26.

Moreover, for example, as for the excitation member 121H having the shape illustrated in FIG. 14 and the excitation member 121I having the shape illustrated in FIG. 15, it has been confirmed that, the shadows could also be sufficiently removed, although there is a possibility of some chattering sound due to the difficulty of securing the adhesive surface because of the shape of the protrusions 221H and 221I.

Note that the excitation members 121A to 121I are examples of the shape of the excitation member 121, and other shapes may be used as long as the shapes have shadow countermeasures.

2. Modification (Configuration of Speaker Device)

Although the configuration of the display device 1 has been described above, the display device 1 also serves as a speaker device that outputs sound, and a configuration including the excitation unit 101 and the excitation member 121 may be regarded as a speaker device. That is, the speaker device including the excitation unit 101, the excitation member 121, and the like can output sound by using, as a diaphragm, the diffusion plate 26 serving as a constituent member that constitutes the liquid crystal panel unit 41.

(Configuration Using Piezoelectric Element)

In the above description, the configuration in which the diffusion plate 26 is vibrated using the excitation unit 101 and the excitation member 121 has been described, but sound may be output by vibrating the diffusion plate 26 using a piezoelectric element (piezoelectric element). For example, the piezoelectric element can be fixed to the diffusion plate 26 using a double-sided tape or the like.

(Installation Position of Excitation Member)

In the above description, it has been described that the excitation member 121 is mounted so as to have a relative positional relationship with the LEDs 51, but the excitation member 121 can be installed at an optional position in consideration of the influence of shadows and chattering sound. In this case, one or more excitation units 101 and excitation members 121 can be provided in consideration of the influence of shadows and chattering sound.

(Other Configurations)

In the above description, the case where the excitation member 121 is mounted by exemplifying the diffusion plate 26 as a constituent member that constitutes the liquid crystal panel unit 41 has been described, but the constituent member to which the excitation member 121 is mounted is not limited to the diffusion plate 26 and may be another constituent member. Furthermore, the color of the excitation member 121 is not limited to one color, and may have a plurality of colors.

As described above, according to the present technology, in a non-self-luminous display device such as a liquid crystal display device, sound can be output from the display surface of a non-self-luminous display cell such as a liquid crystal display cell. Therefore, for example, a sound image can be localized on the display surface of the non-self-luminous display cell.

Note that the embodiments of the present technology are not limited to the above-described embodiments, and various modifications can be made without departing from the gist of the present technology.

Furthermore, the effects described in the present specification are merely examples and are not limited, and other effects may be provided.

Note that the present technology can also have the following configurations.

(1)

A display device including:
a display panel unit that includes a non-self-luminous display cell;
a light source unit that irradiates the display panel unit with light from a back surface; and
an excitation unit that vibrates a constituent member constituting the display panel unit and outputs sound from a display surface of the display cell, in which
the excitation unit provides excitation to an excitation member having a predetermined shape and a predetermined color to vibrate the constituent member that is fixed to the excitation member by a predetermined fixing method.

(2)

The display device according to (1), in which
the constituent member includes a diffusion plate that diffuses light from the light source unit.

(3)

The display device according to (1) or (2), in which
the excitation member has a protrusion that is in contact with a surface of the constituent member.

(4)

The display device according to (3), in which the protrusion includes one or more protrusions and the one or more protrusions serve as points of contact with the surface of the constituent member.

(5)

The display device according to any one of (1) to (4), in which
the excitation member has a color same as or corresponding to a color of the constituent member.

(6)

The display device according to (5), in which
the excitation member is milky white.

(7)

The display device according to any one of (1) to (6), in which
the excitation member is fixed to the constituent member or in abutting contact with the constituent member.

(8)

The display device according to (7), in which
the excitation member is fixed to the constituent member by a stabilizer, an adhesive, or screw fastening.

(9)

The display device according to (7), in which
the excitation member is positioned and fixed in abutting contact with the constituent member by a vibration-damping sheet.

(10)

The display device according to any one of (1) to (9), in which
the display cell includes a liquid crystal display cell, and the light source unit includes a direct-type backlight.

(11)

A speaker device including
an excitation unit that vibrates a constituent member constituting a display panel unit including a non-self-luminous display cell and outputs sound from a display surface of the display cell, in which
the excitation unit provides excitation to an excitation member having a predetermined shape and a predetermined color to vibrate the constituent member that is fixed to the excitation member by a predetermined fixing method.

(12)

The speaker device according to (11), in which
the constituent member includes a diffusion plate that diffuses light from a light source unit that irradiates the display panel unit with light from a back surface.

(13)
   The speaker device according to (11) or (12), in which
   the excitation member has a protrusion that is in contact with a surface of the constituent member.
(14)
   The speaker device according to (13), in which
   the protrusion includes one or more protrusions and the one or more protrusions serve as points of contact with the surface of the constituent member.
(15)
   The speaker device according to any one of (1) to (14), in which
   the excitation member has a color same as or corresponding to a color of the constituent member.
(16)
   The speaker device according to (15), in which
   the excitation member is milky white.
(17)
   The speaker device according to any one of (11) to (16), in which
   the excitation member is fixed to the constituent member or in abutting contact with the constituent member.
(18)
   The speaker device according to (17), in which
   the excitation member is fixed to the constituent member by a stabilizer, an adhesive, or screw fastening.
(19)
   The speaker device according to (17), in which
   the excitation member is positioned and fixed in abutting contact with the constituent member by a vibration-damping sheet.
(20)
   The speaker device according to any one of (11) to (19), in which
   the display cell includes a liquid crystal display cell, and
   the light source unit includes a direct-type backlight.

REFERENCE SIGNS LIST

1 Display device
11 Housing
21 Bezel
22 Back chassis
23 Rear cover
24 Liquid crystal display cell
24A Display surface
25 Optical sheet
26 Diffusion plate
27 Reflective sheet
28 Circuit board
29 Light source cover
41 Liquid crystal panel unit
42 Backlight unit
51 LED
121, 121A to 121I Excitation member
131 Voice coil
132 Yoke
133 Magnet
134 Plate
135 Damper
221, 221A to 221I Protrusion

The invention claimed is:

1. A display device comprising:
   a display panel unit that includes a non-self-luminous display cell;
   a light source unit that irradiates the display panel unit with light from a back surface; and
   an excitation unit that vibrates a constituent member constituting the display panel unit and outputs sound from a display surface of the display cell, wherein
   the excitation unit provides excitation to an excitation member having a predetermined shape and a predetermined color to vibrate the constituent member that is fixed to the excitation member by a predetermined fixing method, wherein the excitation member has a color that is the same as a color of the constituent member.

2. The display device according to claim 1, wherein
   the constituent member includes a diffusion plate that diffuses light from the light source unit.

3. The display device according to claim 1, wherein
   the excitation member has a protrusion that is in contact with a surface of the constituent member.

4. The display device according to claim 3, wherein
   the protrusion comprises one or more protrusions and the one or more protrusions serve as points of contact with the surface of the constituent member.

5. The display device according to claim 1, wherein
   the excitation member is milky white.

6. The display device according to claim 1, wherein
   the excitation member is fixed to the constituent member or in abutting contact with the constituent member.

7. The display device according to claim 6, wherein
   the excitation member is fixed to the constituent member by a stabilizer, an adhesive, or screw fastening.

8. The display device according to claim 6, wherein
   the excitation member is positioned and fixed in abutting contact with the constituent member by a vibration-damping sheet.

9. The display device according to claim 1, wherein
   the display cell includes a liquid crystal display cell, and
   the light source unit includes a direct-type backlight.

10. A speaker device comprising
   an excitation unit that vibrates a constituent member constituting a display panel unit including a non-self-luminous display cell and outputs sound from a display surface of the display cell, wherein
   the excitation unit provides excitation to an excitation member having a predetermined shape and a predetermined color to vibrate the constituent member that is fixed to the excitation member by a predetermined fixing method, wherein the excitation member has a color that is the same as a color of the constituent member.

11. The speaker device according to claim 10, wherein
   the constituent member includes a diffusion plate that diffuses light from a light source unit that irradiates the display panel unit with light from a back surface.

12. The speaker device according to claim 10, wherein
   the excitation member has a protrusion that is in contact with a surface of the constituent member.

13. The speaker device according to claim 12, wherein
   the protrusion comprises one or more protrusions and the one or more protrusions serve as points of contact with the surface of the constituent member.

14. The speaker device according to claim 10, wherein
   the excitation member is milky white.

15. The speaker device according to claim 10, wherein
   the excitation member is fixed to the constituent member or in abutting contact with the constituent member.

16. The speaker device according to claim 15, wherein
   the excitation member is fixed to the constituent member by a stabilizer, an adhesive, or screw fastening.

17. The speaker device according to claim 15, wherein the excitation member is positioned and fixed in abutting contact with the constituent member by a vibration-damping sheet.

18. The speaker device according to claim 10, wherein the display cell includes a liquid crystal display cell, and the light source unit includes a direct-type backlight.

* * * * *